United States Patent Office 2,933,901
Patented Apr. 26, 1960

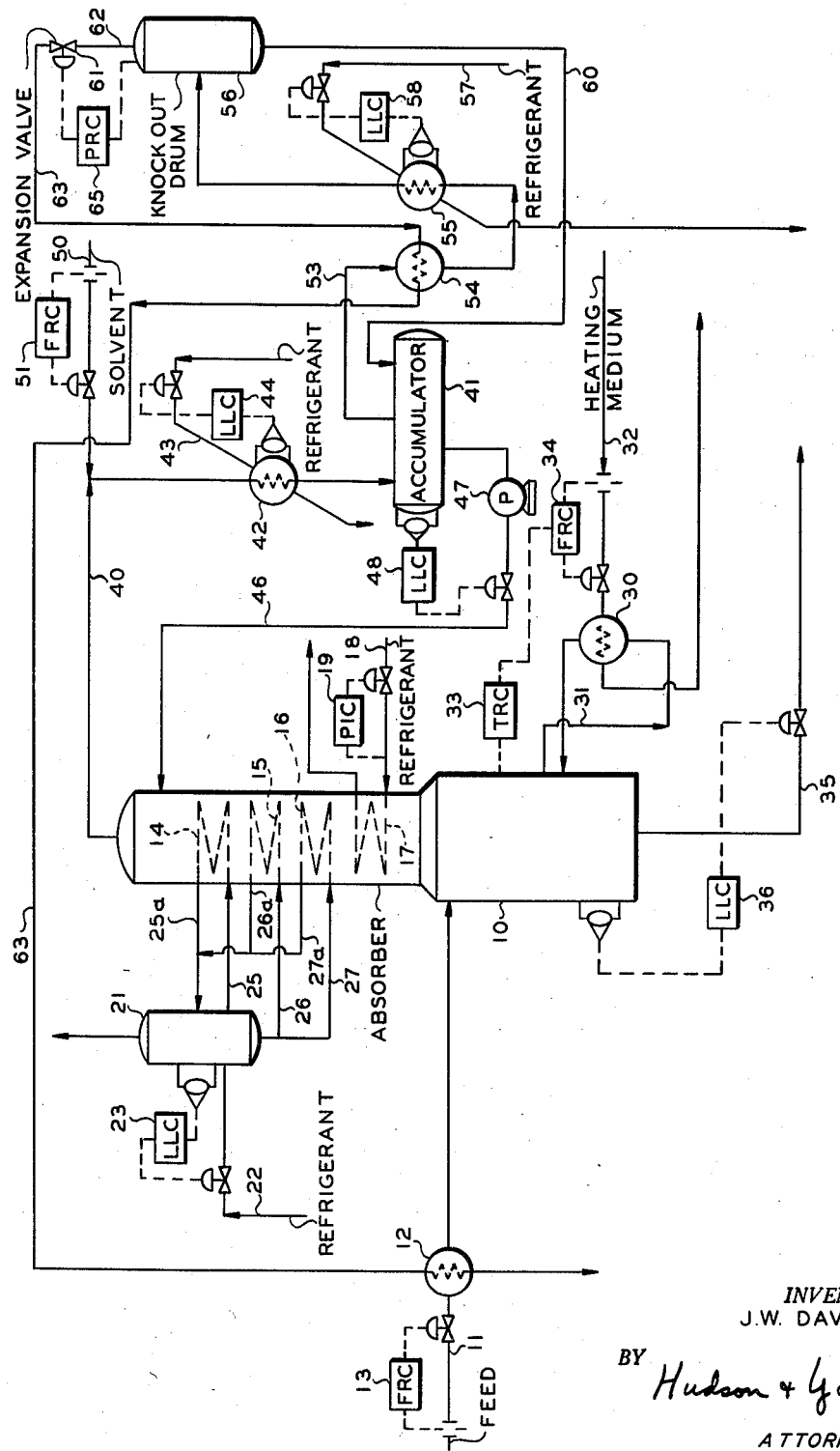

2,933,901
SEPARATION OF FLUID MIXTURES

Joseph W. Davison, Bartlesville, Okla., assignor to Phillips Petroleum Company, a corporation of Delaware Application December 19, 1955, Serial No. 553,787

4 Claims. (Cl. 62—37)

This invention relates to a method of and apparatus for removing selected constituents from normally gaseous mixtures.

It is known that ethylene and other low molecular weight unsaturated hydrocarbons can advantageously be produced by the thermal cracking of light hydrocarbons such as butane. The effluent from such a cracking process comprises gases having boiling points over a wide temperature range. One proposed system for separating the desired gases, such as ethylene, from such a mixture involves initially removing the $C_4$ and heavier hydrocarbons in an absorption column. The next step involves removing methane and hydrogen. While conventional fractionation systems can be employed to remove methane and lighter gases from gaseous mixtures, such systems present operating difficulties because of the exceedingly low temperatures which must be employed, and have greater energy requirements for the separation.

In accordance with the present invention there is provided a system for separating low boiling gases, such as methane, from a normally gaseous mixture containing heavier constituents. In the present preferred embodiment of this invention the feedstream is passed into a fractionation column which is operated as a reboiled absorber. A solvent, such as liquid propylene, is introduced into the upper region of the column to absorb the constituents heavier than methane. The overhead gases from the column are cooled and passed to an accumulator. Liquid is withdrawn from the accumulator and returned to the column as reflux. Gases are removed from the accumulator, cooled and passed to a liquid-vapor separator. The liquid from the separator is returned to the column, preferably through the accumulator, as reflux. The gases from the separator are allowed to expand so as to be cooled by the Joule-Thomson effect. The cooled gases are passed in heat exchange relationship with the gases initially removed from the accumulator. These cooled gases can further be passed in heat exchange relationship with the feed to the column to provide initial cooling.

Accordingly, it is an object of this invention to provide an improved method of and apparatus for separating normally gaseous mixtures into selected constituents.

Another object is to provide a system for removing methane and lighter gases from hydrocarbon mixtures.

Other objects, advantages and features of the invention should become apparent from the following detailed description taken in conjunction with the accompanying drawing which is a schematic representation of apparatus employed to carry out the method of this invention.

Referring now to the drawing in detail, there is shown a fractionation column 10 which is operated as a reboiled absorber. The feedstream to be separated is supplied to column 10 through an inlet conduit 11 which has a heat exchanger 12 therein. The feed mixture is introduced into column 10 at a predetermined rate which is maintained by a flow recorder-controller 13. Cooling coils 14, 15, 16 and 17 are positioned to the upper region of column 10. A first refrigerant is circulated through coil 17 by means of a conduit 18. The refrigerant is delivered to coil 17 at a constant pressure which is maintained by a pressure indicator-controller 19. A second refrigerant is supplied to an accumulator 21 by an inlet conduit 22. The level of liquid refrigerant in accumulator 21 is maintained by a liquid level controller 23 which adjusts the flow through conduit 22. Liquid refrigerant is supplied to coils 14, 15 and 16 from accumulator 21 through respective conduits 25, 26 and 27. The vaporized refrigerant is returned to accumulator 21 through conduits 25a, 26a and 27a. A portion of the liquid in the lower region of column 10 is passed through a reboiler 30 by means of a conduit 31. A heating medium is circulated through exchanger 30 by means of a conduit 32. This medium is supplied to exchanger 30 at a rate so as to maintain a constant temperature in column 10. This is controlled by a temperature recorder-controller 33 which adjusts a flow recorder-controller 34 in conduit 32 in response to the temperature in the lower region of column 10.

The kettle product from column 10 is removed through an outlet conduit 35 at a rate which is maintained by a liquid level controller 36.

Gases are removed from the upper region of column 10 through a conduit 40 which communicates with an accumulator 41 through a heat exchanger 42. A liquid refrigerant is passed through exchanger 42 by means of a conduit 43. This refrigerant vaporizes in exchanger 42 to cool the gases passing through conduit 40. The flow of refrigerant through the exchanger is adjusted by a liquid level controller 44 which measures the level of liquid refrigerant within the exchanger. The condensed gases in accumulator 41 are returned to the upper portion of column 10 as reflux through a conduit 46 having a pump 47 therein. The flow through conduit 46 is adjusted by a liquid level controller 48 on accumulator 41. A liquid solvent comprising a hydrocarbon having three or four carbon atoms per molecule is supplied to column 10 through a conduit 50 which communicates with conduit 40 upstream from heat exchanger 42. The solvent is supplied at a predetermined rate which is maintained by a flow recorder-controller 51. However, it is not essential to the operation of this invention that the solvent be added to the system at this point. If desired, the solvent can be added directly to column 10.

Gases in accumulator 41 are removed through a conduit 53 which passes through heat exchangers 54 and 55 and communicates with a knock-out drum 56. Heat exchanger 55 is cooled by a liquid refrigerant which is circulated therethrough by a conduit 57. The flow of refrigerant through conduit 57 is regulated by a liquid level controller 58. Liquid which accumulates in drum 56 is returned to accumulator 41 through a conduit 60. The upper region of drum 56 communicates with the inlet of a valve 61 by means of a conduit 62. Gases in drum 56 are allowed to expand through valve 61 so as to be cooled by the Joule-Thomson effect. These expanded gases are passed by a conduit 63 through heat exchangers 54 and 12. The opening of valve 61 is regulated by a pressure recorder-controller 65 in response to the pressure in drum 56.

The operation of the separating system of this invention can be explained by the following illustrative example. The feedstream supplied to column 10 through conduit 11 has the following composition:

| Material: | Moles per unit time |
|---|---|
| Hydrogen | 423 |
| Methane | 1,761 |
| Ethylene | 1,351 |
| Ethane | 296 |
| Propylene | 493 |
| Propane | 23 |

The temperature of the feedstream entering the system is −18° F. The gases are cooled in passing through exchanger 12 to a temperature of −56° F. Column 10 is operated at a pressure of 400 pounds per square inch absolute (p.s.i.a.). The temperature at the bottom of column 10 is 65° F. and the temperature at the top of the column is −50° F. Propylene at a temperature of 112° F. is introduced into heat exchanger 30. This heating medium is removed from exchanger 30 at a temperature of 69° F. Liquid ethylene at −65° F. is supplied to storage tank 21 and is directed therefrom through coils 14, 15 and 16. Liquid ethane at −65° F. is supplied to coil 17 by conduit 18.

The gases removed from the top of column 10 expand slightly in passing through conduit 40 so that the temperature of the gases at the junction with conduit 50 is approximately −55° F. A solvent is supplied through conduit 50 at a temperature of −28° F. The composition of the solvent is as follows:

| Material: | Moles per unit time |
|---|---|
| Propylene | 1,219 |
| Propane | 57 |

The resulting mixture which enters exchanger 42 is at a temperature of −32° F. These gases are cooled to −56° F. by means of liquid ethylene vaporizing in exchanger 42 at a temperature of −65° F. Accumulator 41 is maintained at a temperature of −56° F. and at a pressure of 395 p.s.i.a.

The gases removed from accumulator 41 are cooled to −99° F. after passage through exchanger 54. The gases are further cooled to −112° F. after passing through exchanger 55. Exchanger 55 is cooled by ethylene vaporizing at a temperature of −120° F. Knock-out drum 56 is maintained at −112° F. and at a pressure of 395 p.s.i.a. The gases removed from drum 56 are permitted to expand to a pressure of 80 p.s.i.a. which results in a cooling to −150° F. The cooled gases are heated to −66° F. after passing through exchanger 54 and are further heated to −28° F. after passing through exchanger 12. The kettle product from column 10 is essentially free of hydrogen and methane.

It has been discovered that, in general, the higher the pressure in column 10, the less the overall plant energy requirements for recovery of ethylene at a given low temperature. This applies up to such a pressure that the bottoms product is near the critical temperature or pressure of the mixture, under which conditions the methane cannot effectively be reboiled from the bottoms product. Therefore, useful operating pressures are in the range of about 300 to 500 p.s.i.a., the optimum being about 400 p.s.i.a. With reference to temperature, the lower the demethanizer absorbent temperature, the lower the overall plant energy requirements, down to an absorbent temperature of about −56 to −110° F. There is little difference in energy consumption between these temperature levels. Therefore, useful operating temperatures are about −30 to −110° F. absorbent temperature, with −50 to −75° F. considered optimum. Temperatures lower than −75° F. are less desirable because an additional refrigeration compression stage is needed, additional investment is required for low temperature materials of construction and thicker insulation, and increased operating difficulties are encountered.

The present invention thus provides a novel method of and apparatus for removing light gases such as methane from a gaseous mixture. The absorption operation permits operation of the column at considerably higher temperatures and lower pressures than are possible by conventional fractionation. The gas expansion and heat exchange steps provide sufficiently low temperatures to recover additional ethylene. These low temperatures are obtained with a minimum of external refrigeration. It should be evident that the foregoing example is merely illustrative of a present preferred embodiment of the invention and should not be considered as a limitation to the designated conditions of temperatures, pressures and compositions.

What is claimed is:

1. Separating apparatus comprising a fractionation column, a first heat exchanger, first conduit means to introduce a feed stream into said column through said first heat exchanger, means to remove a bottoms stream from said column, an accumulator, second conduit means communicating between the top of said column and said accumulator, means to cool gas flowing through said second conduit means to condense a portion of same, means to return liquid from said accumulator to said column as reflux, means to pass a solvent into the upper portion of said column, heat exchange means, a liquid-gas separator, third conduit means to direct gas from said accumulator to said separator through said heat exchange means, a valve, conduit means to direct gases from said separator through said valve and then through said heat exchange means and said first heat exchanger to cool gas passed to said separator and the feed stream passed to said column, means responsive to the pressure in said separator to control the opening of said valve to tend to maintain a predetermined pressure in said separator, and conduit means to pass liquid from said separator to said accumulator.

2. The combination in accordance with claim 1 wherein said means to pass a solvent, communicates with said second conduit means at a point upstream from where gas is cooled in said first conduit means.

3. Separating apparatus comprising a fractionation column, a first heat exchanger, first conduit means to introduce a feed stream into said column through said first heat exchanger, second conduit means to remove a bottoms stream from said column, means to heat the lower region of said column, means to cool the upper region of said column, an accumulator, a second heat exchanger, means to circulate a refrigerant through said second heat exchanger, third conduit means to pass gas from the top of said column to said accumulator through said second heat exchanger, fourth conduit means communicating with said second conduit means between said column and said third heat exchanger fifth conduit means communicating between said accumulator and said column to return liquid to said column as reflux, fourth and fifth heat exchangers, a liquid-gas separator, sixth conduit means to pass gas from said accumulator to said separator through said fourth and fifth heat exchangers, means to circulate a refrigerant from an external source through said fifth heat exchanger, seventh conduit means to pass liquid from said separator to said accumulator, a valve, eighth conduit means to pass gas from said separator through said valve and said fourth and first heat exchangers, and means responsive to the pressure in said separator to control the opening of said valve so that expansion of gas through said valve cools gas passed to said separator and the feed passed to said column.

4. Separating apparatus comprising a fractionation column, a first heat exchanger, first conduit means communicating with said column through said first heat exchanger to introduce a feed stream into said column, flow control means to maintain a predetermined flow through said first conduit means, second conduit means communicating with the bottom of said column to remove a product stream, means responsive to the liquid level in said column to control the flow through said second conduit means to tend to maintain a predetermined liquid level in said column, means to heat the lower region of said column, means to cool the upper region of said column by means of a refrigerant from an external source, an accumulator, a second heat exchanger, means to circulate a refrigerant through said second heat exchanger, third conduit means communicating between the top of said column and said accumulator through said second heat exchanger to remove gas from said column, fourth conduit means communicating with said third conduit means between said column and said second heat exchange means to supply a solvent, fifth conduit means communicating between said accumulator and said column to return liquid to said column as reflux, means responsive to the liquid level in said accumulator to control the flow through said fifth conduit means to tend to maintain a predetermined liquid level in said accumulator, third and fourth heat exchangers, a liquid-gas separator, sixth conduit means communicating between said accumulator and said separator through said third and fourth heat exchangers to pass gas from said accumulator to said separator, means to circulate a refrigerant from an external source through said fourth heat exchanger, seventh conduit means communicating between said separator and said accumulator to return liquid to said accumulator, eighth conduit means communicating between said separator and said third and first heat exchangers, a valve in said eighth conduit means between said separator and said third heat exchanger, and means responsive to the pressure in said separator to control the opening of said valve so that expansion of gas through said valve cools the gas passed to said separator through said third heat exchanger and the feed passed to said column through said first heat exchanger.

References Cited in the file of this patent

UNITED STATES PATENTS

| | | |
|---|---|---|
| 2,134,699 | Brewster | Nov. 1, 1938 |
| 2,175,590 | Barton | Oct. 10, 1939 |
| 2,258,749 | Eaton | Oct. 14, 1941 |
| 2,407,997 | Patterson | Sept. 24, 1946 |
| 2,468,750 | Gudenrath | May 3, 1949 |
| 2,519,955 | Deming | Aug. 22, 1950 |
| 2,529,312 | Rupp | Nov. 7, 1950 |
| 2,534,274 | Kniel | Dec. 19, 1950 |
| 2,552,451 | Patterson | May 8, 1951 |
| 2,557,171 | Bodle | June 19, 1951 |
| 2,573,341 | Kniel | Oct. 30, 1951 |
| 2,581,088 | Etherington | Jan. 1, 1952 |
| 2,583,090 | Cost | Jan. 22, 1952 |
| 2,600,494 | Ferro | June 17, 1952 |
| 2,610,704 | Patterson | Sept. 16, 1952 |
| 2,666,019 | Winn | Jan. 12, 1954 |
| 2,677,945 | Miller | May 11, 1954 |
| 2,713,781 | Williams | July 26, 1955 |
| 2,769,321 | Stiles | Nov. 6, 1956 |
| 2,775,103 | Koble | Dec. 25, 1956 |

UNITED STATES PATENT OFFICE

CERTIFICATE OF CORRECTION

Patent No. 2,933,901                April 26, 1960

Joseph W. Davison

It is hereby certified that error appears in the printed specification of the above numbered patent requiring correction and that the said Letters Patent should read as corrected below.

Column 4, line 42, for "second" read -- third --; line 43, for "third" read -- second --.

Signed and sealed this 29th day of November 1960.

(SEAL)
Attest:

KARL H. AXLINE
Attesting Officer

ROBERT C. WATSON
Commissioner of Patents